United States Patent
Yates, III

(10) Patent No.: US 7,157,040 B2
(45) Date of Patent: Jan. 2, 2007

(54) HELICAL BLOW MOLDING PREFORM AND METHOD OF MANUFACTURING

(76) Inventor: William M. Yates, III, 56 Raven La., Aliso Viejo, CA (US) 92656

( * ) Notice: Subject to any disclaimer, the term of this patent is extended or adjusted under 35 U.S.C. 154(b) by 0 days.

(21) Appl. No.: 11/163,765

(22) Filed: Oct. 29, 2005

(65) Prior Publication Data

US 2006/0097432 A1     May 11, 2006

Related U.S. Application Data

(60) Provisional application No. 60/624,010, filed on Nov. 1, 2004.

(51) Int. Cl.
*B29C 49/12* (2006.01)
*B29C 49/20* (2006.01)

(52) U.S. Cl. ............... 264/532; 264/534; 264/535; 264/537

(58) Field of Classification Search ............ 264/532, 264/534, 535, 537
See application file for complete search history.

(56) References Cited

U.S. PATENT DOCUMENTS

| | | | | |
|---|---|---|---|---|
| 2,951,264 A | * | 9/1960 | Bailey | 264/532 |
| 5,529,195 A | * | 6/1996 | Valyi | 215/6 |
| 5,849,241 A | * | 12/1998 | Connan | 264/529 |

* cited by examiner

*Primary Examiner*—Suzanne E. McDowell
(74) *Attorney, Agent, or Firm*—Felix L. Fischer

(57) ABSTRACT

A multiple cavity bottle is manufactured by injection molding a preform having a helical septum and blow molding the preform to create a bottle having a helical septum separating the bottle into two cavities. The helical septum is molded with a twist sufficient to accommodate a contact point size for stretch rods used in blow molding. Blow molding is then accomplished by inserting at least two stretch rods from the top end of the preform to the contact points, heating the preform to a softening temperature, extending the stretch rods to stretch the preform and introducing gas pressure into the preform to stretch a blow molding portion into a final bottle shape within a mold.

13 Claims, 8 Drawing Sheets

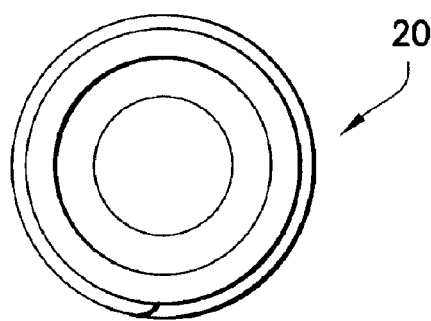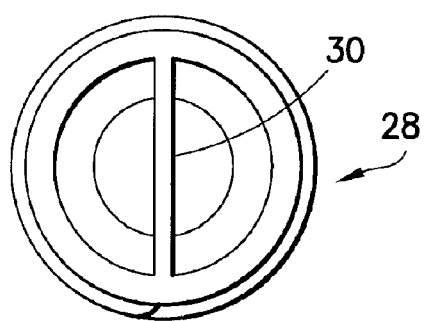
FIG.1b
PRIOR ART
FIG.1d
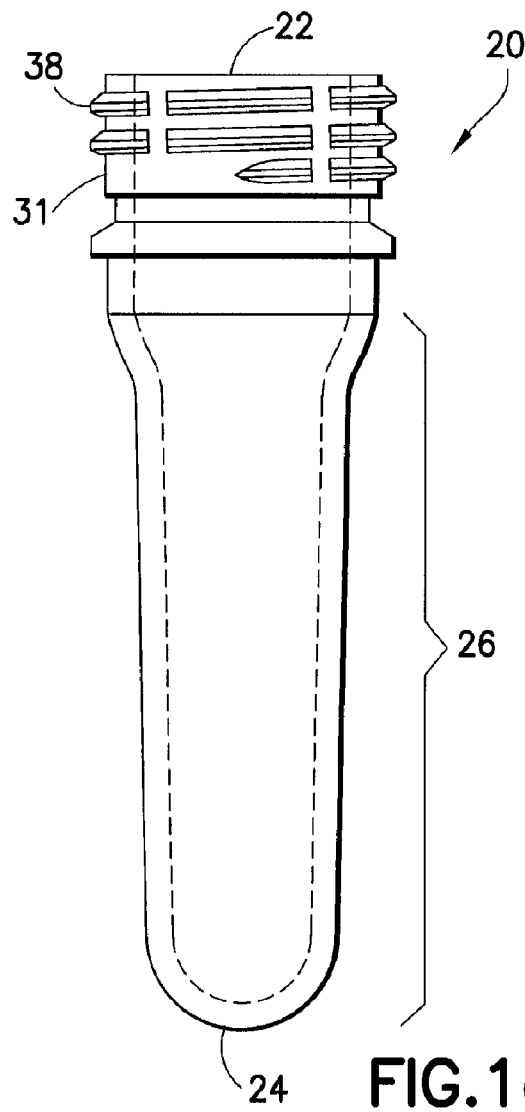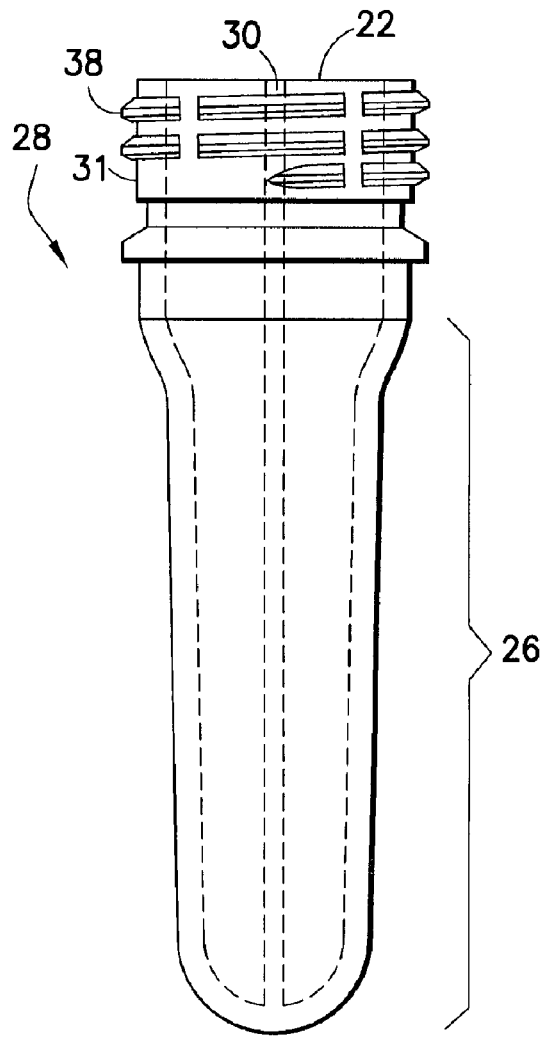
FIG.1a
PRIOR ART
FIG.1c

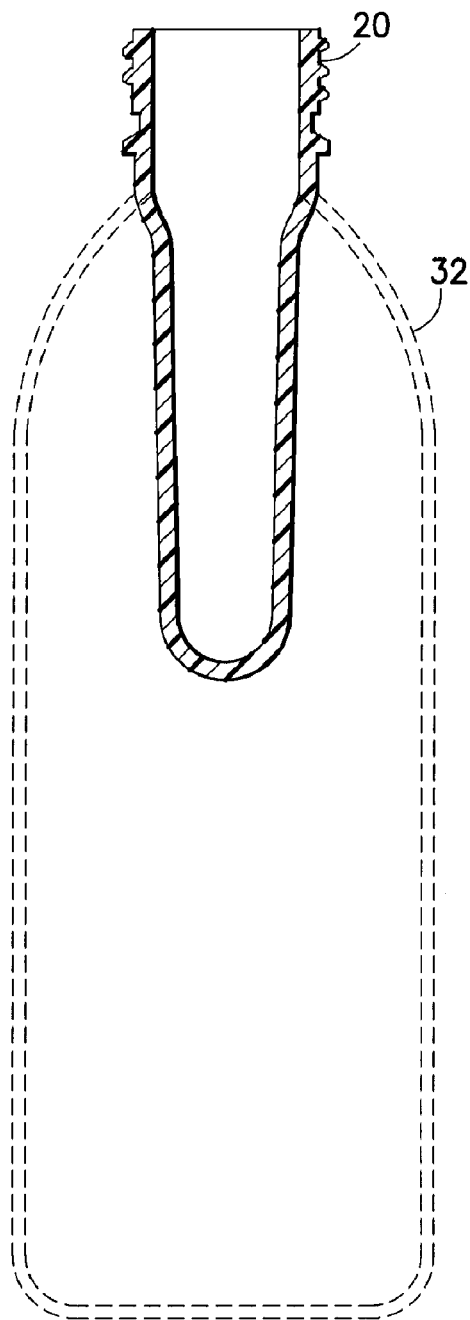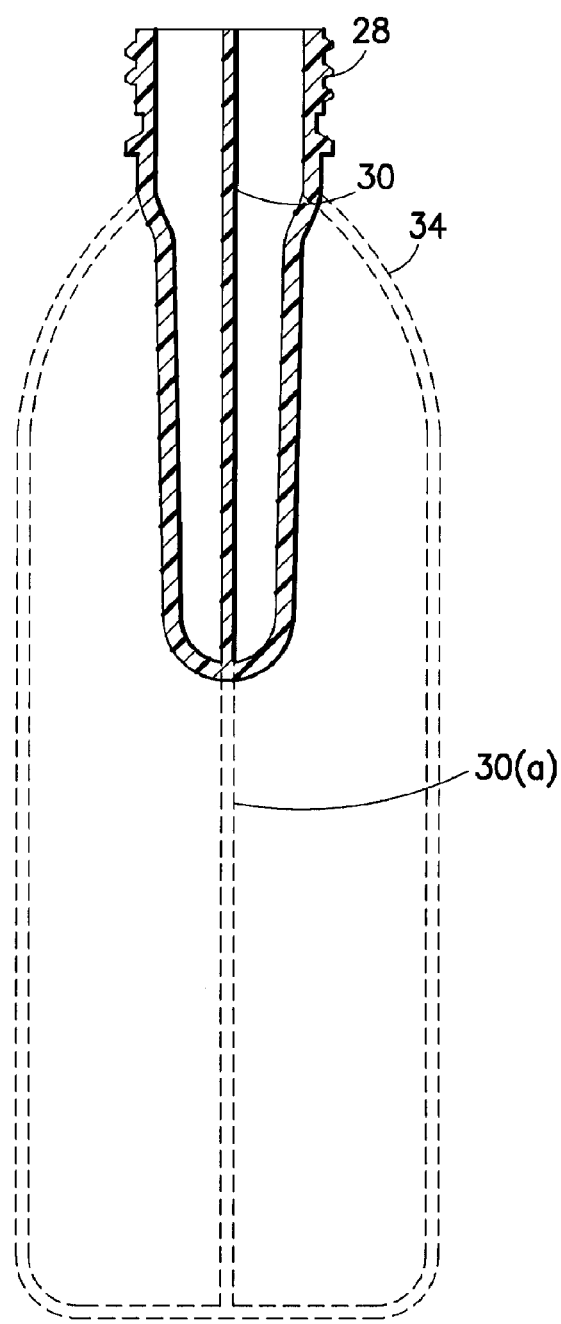
FIG.2a
PRIOR ART
FIG.2b

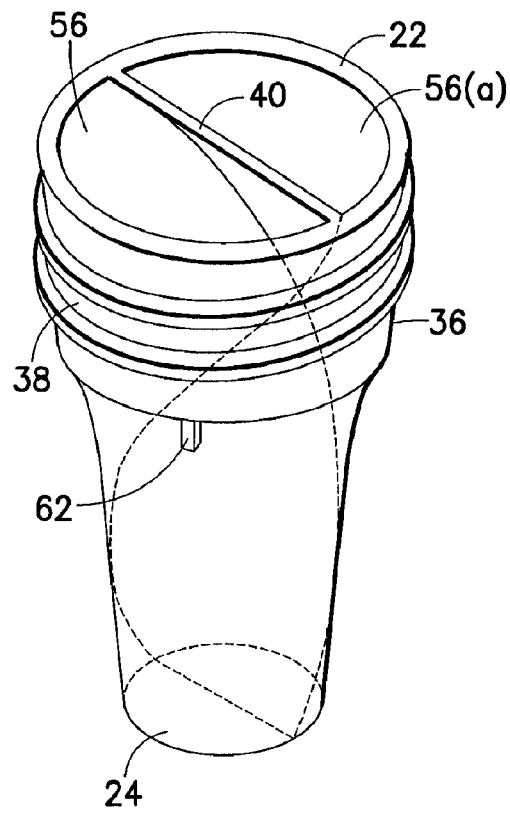
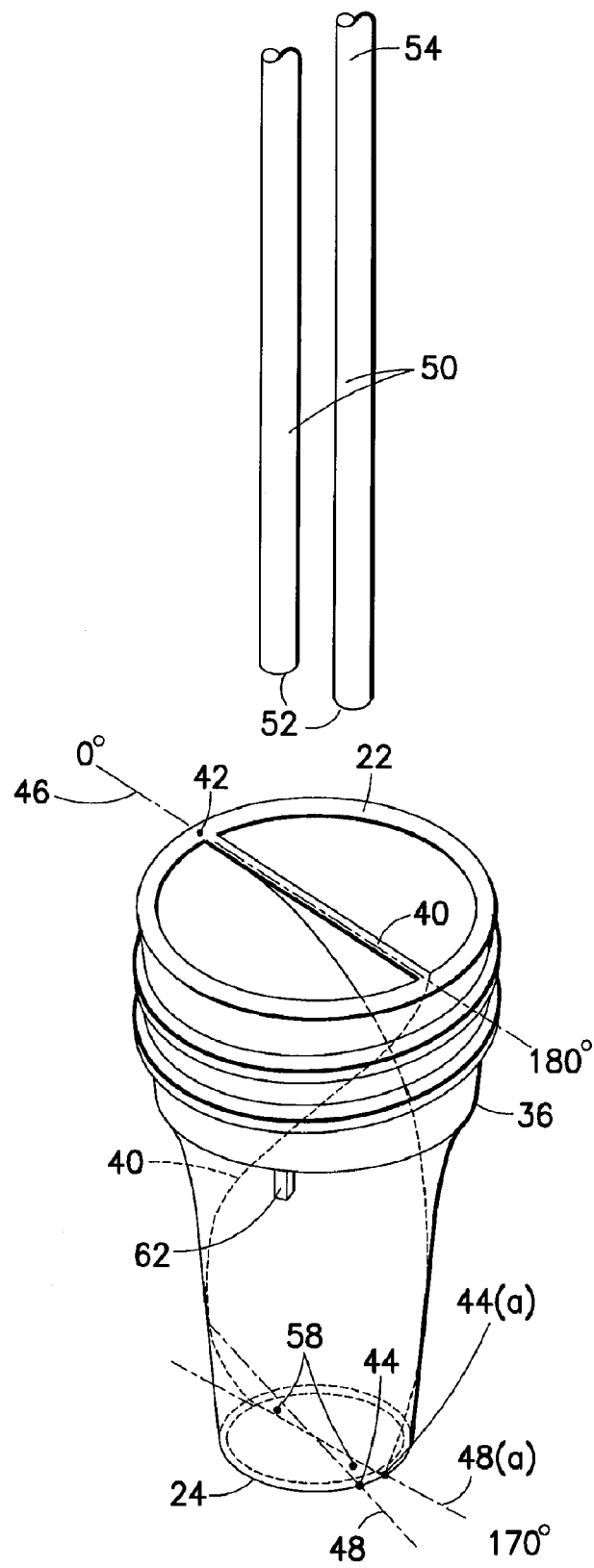
FIG.3a
FIG.3b

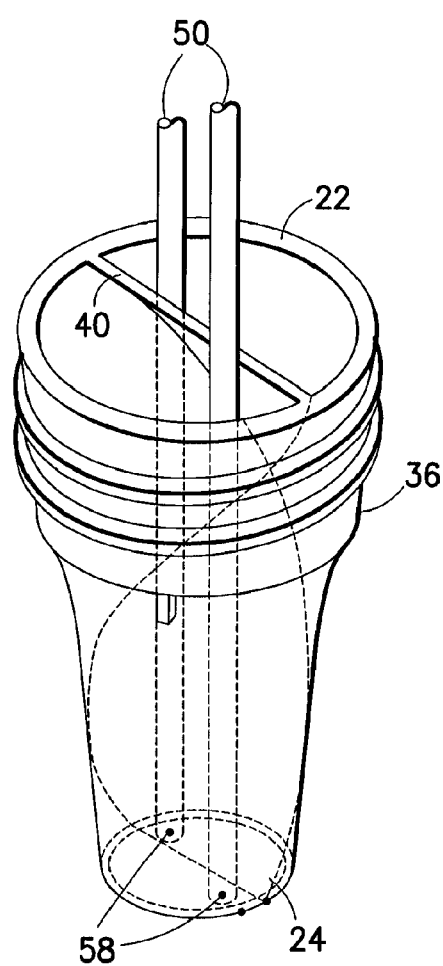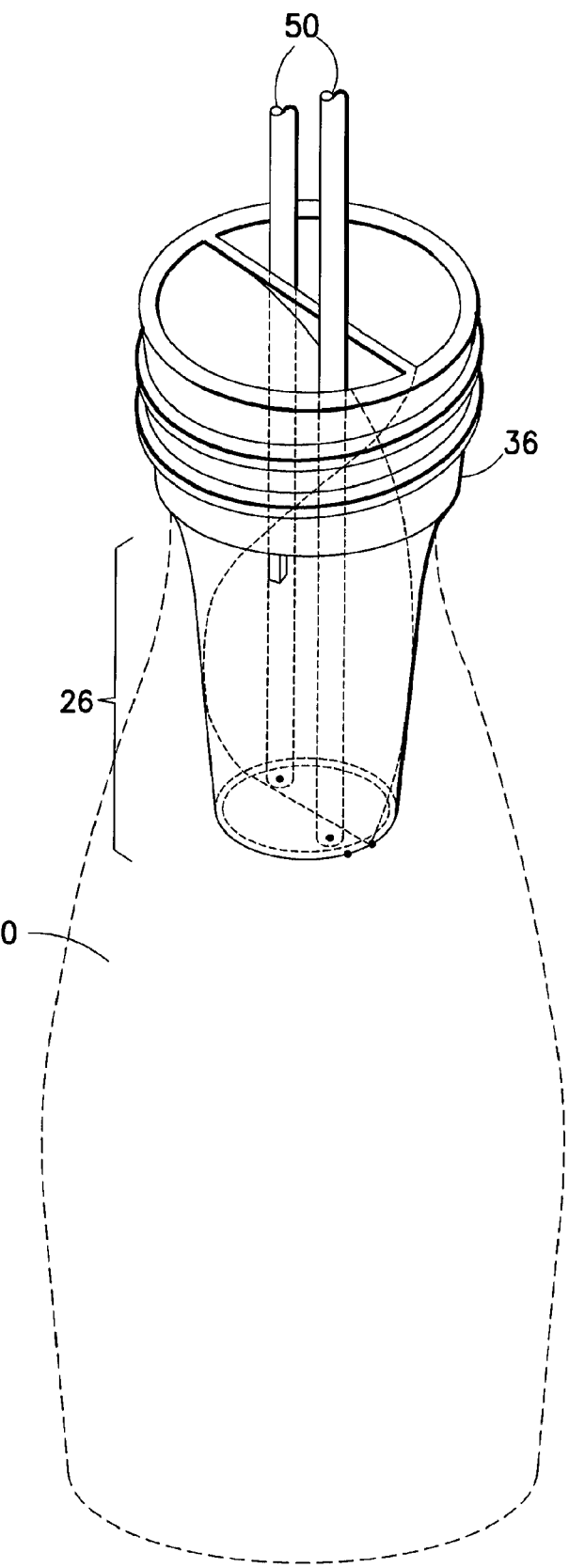
FIG.3c
FIG.3d

FIG.4a
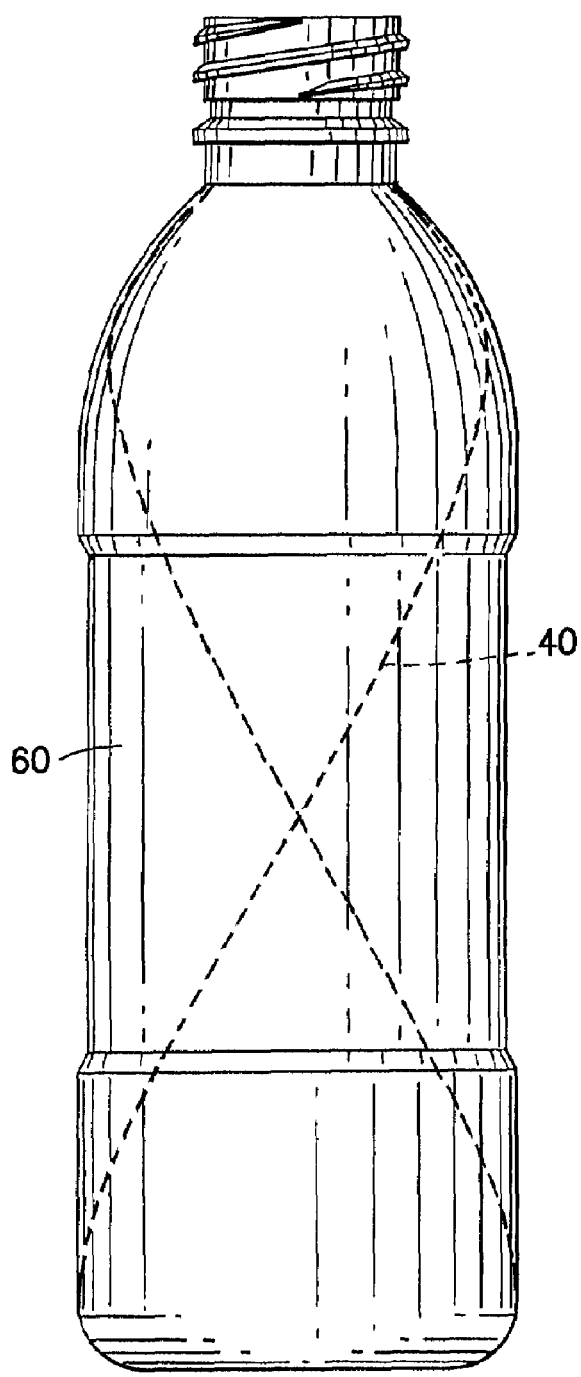
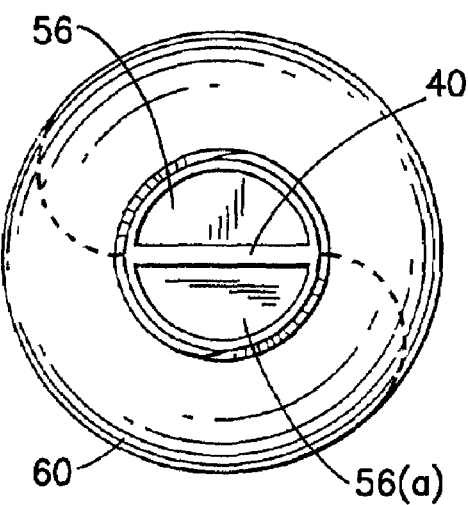
FIG.4b

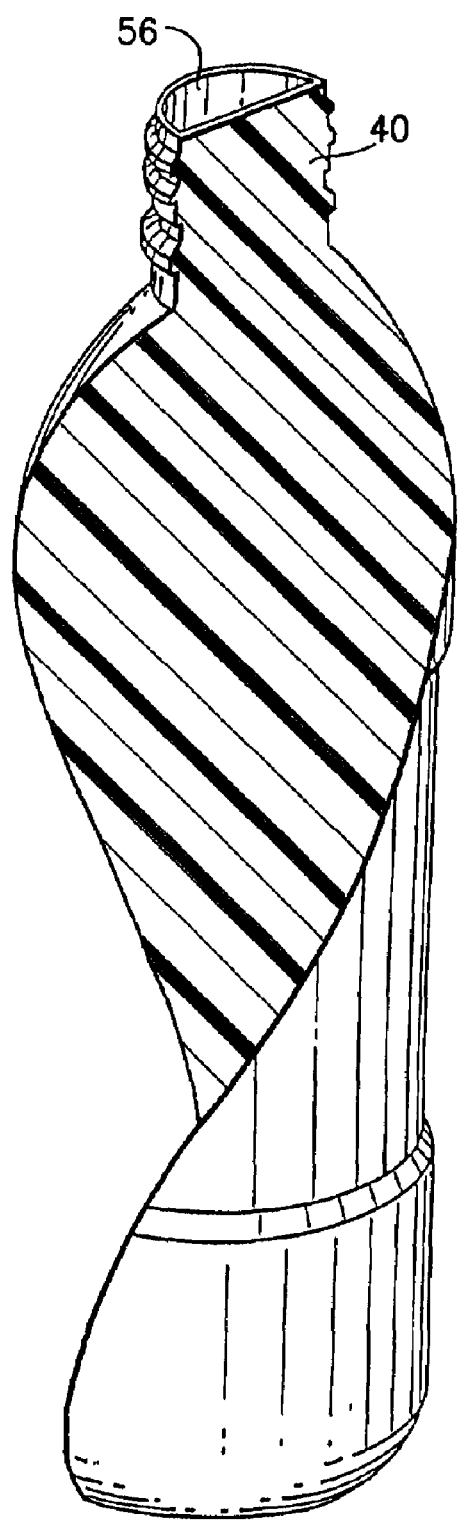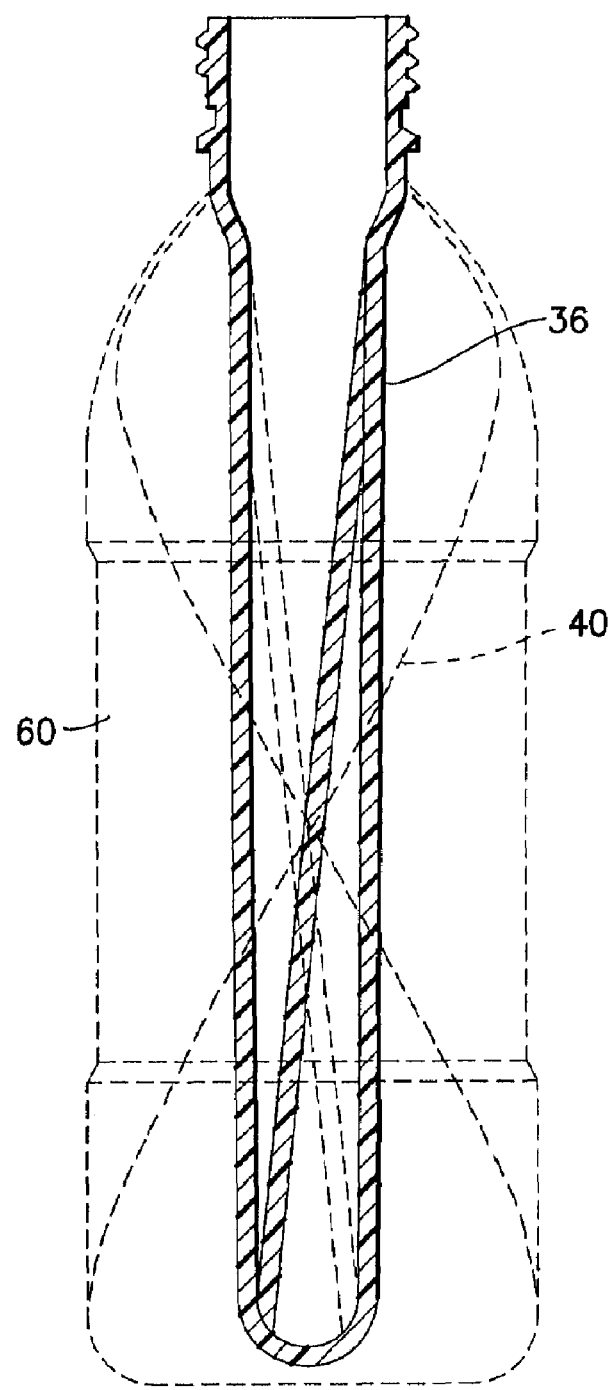
FIG.6
FIG.7

HELICAL BLOW MOLDING PREFORM AND METHOD OF MANUFACTURING

RELATED APPLICATIONS

This application claims priority of provisional application Ser. No. 60/624,010 filed on Nov. 1, 2004 entitled HELICAL PREFORM AND METHOD OF MANUFACTURING SAME and is copending with U.S. patent application Ser. No. 10/942,332 filed on Sep. 15, 2004 entitled MULTIPLE CAVITY BOTTLE AND METHOD OF MANUFACTURING SAME which claims priority of U.S. provisional application Ser. No. 60/502,892 filed Sep. 15, 2003 entitled "BOTTLE HAVING MULTIPLE CAVITIES" and U.S. provisional application Ser. No. 60/551,166 filed Mar. 8, 2004 entitled MULTIPLE CAVITY BOTTLE AND METHOD OF MANUFACTURING SAME, the disclosures of which are fully incorporated herein by reference.

BACKGROUND

1. Field of the Invention

This invention generally relates to liquids containers, and more specifically to a blow molding preform for a bottle with multiple chambers in a common container for different commodities and a method for making said preform.

2. Description of the Related Art

Liquid storage containers have been provided in numerous sizes and shapes for various liquid commodities. The most ubiquitous containers are presently plastic and provide multiple sizes and shapes with mass production capability and recyclable materials.

In many endeavors, individuals use multiple commodities in combination. Sports enthusiasts are typically becoming aware of the benefits of combining the use of electrolyte replacing sports drinks with water for ultimate performance enhancement and refreshment. Children often desire to purchase more than a single flavor of soft drink or juices or combine a soft drink or juice with other liquid refreshment such as water or milk.

Beverage companies frequently launch new product flavors and have the need to inform customers that the new flavors are associated with their existing well-known brand and comprise part of their product portfolio. Currently, these companies are limited to arranging single-cavity bottles containing the new flavors in close proximity to other single-cavity bottles containing the well-known brand at the point of purchase. Those skilled in the art of manufacturing beverage bottles are aware that most plastic beverage bottles are formed by first injection molding a preform and then blowmolding the preform into a single cavity bottle. There have been attempts in other consumer product industries to form dual cavity bottles by manufacturing two single cavity bottles and connecting them together such as by a male and female dovetail groove. However, such configurations require assembly and are costly due to the final bottle being comprised of two elements.

It is therefore desirable to provide a preform for blow molding of single part containers having multiple cavities or chambers for storage of different commodities.

For presentation of multiple beverages in a single bottle that can readily be appreciated by the consumer as being a new and unique bottle containing two different beverages, both beverages should be visible to the consumer irrespective of the orientation or position of the beverage bottle at the point of sale. Such an appearance can be obtained if the cavities "wrap around" each other in a spiral-like configuration. Therefore it is desirable that a further improved preform having a helically twisting septum be provided for a one part bottle having dual cavities, the cavities separated by a helically twisted septum, which allows the two beverage cavities to present a "wrap around" look to the consumer.

SUMMARY OF THE INVENTION

A multiple cavity bottle is manufactured according to the present invention by injection molding a preform having a helical septum and blow molding the preform to create a bottle having a helical septum separating the bottle into two cavities. To accomplish the injection molding a contact point size is predetermined based on stretch rod diameter and the helical septum is molded with a twist from a first reference line proximate a top end of the preform to a second reference line proximate a bottom end of the preform, with the sectors formed by the second reference line and a projection of the first reference line in a plane with the second reference line sufficient to accommodate the contact point size. Blow molding is then accomplished by heating the preform to a softening temperature, inserting at least two stretch rods from the top end of the preform to contact points in the sectors, extending the stretch rods to stretch the preform and introducing gas pressure into the preform to stretch a blow molding portion into a final bottle shape within a mold.

BRIEF DESCRIPTION OF THE DRAWINGS

These and other features and advantages of the present invention will be better understood by reference to the following detailed description when considered in connection with the accompanying drawings wherein:

FIGS. 1a and 1b are a side and top view of a prior art preform for blow molded bottles;

FIGS. 1c and 1d are side and top views of a new preform for blow molded bottles employing a septum for a dual cavity bottle;

FIG. 2a shows a superimposed side section view of the preform of FIG. 1a and the resulting bottle after blow molding in phantom;

FIG. 2b shows a superimposed side section view of the preform of FIG. 1c and the resulting bottle after blow molding in phantom;

FIG. 3a is an isometric view of a preform according to the present invention;

FIG. 3b is an isometric view of the preform of FIG. 3a showing angular relationships of the top and bottom of the helical septum and the stretch rods employed for forming;

FIG. 3c an isometric view of the preform of FIG. 3b with the stretch rods inserted into the preform;

FIG. 3d is an isometric superimposed view of the preform of FIG. 3c with the resulting exterior bottle shape shown in phantom FIGS. 4a and 4b are the side and top view of a completed blow molding of the bottle from the preform shown in FIG. 3a;

FIG. 6 is a sectioned view along the section 6—6 of FIG. 5;

FIG. 7 is a side section view of an alternative long embodiment of the preform according to the present invention with the resulting bottle shown in phantom.

DETAILED DESCRIPTION OF THE INVENTION

Figure 4C:
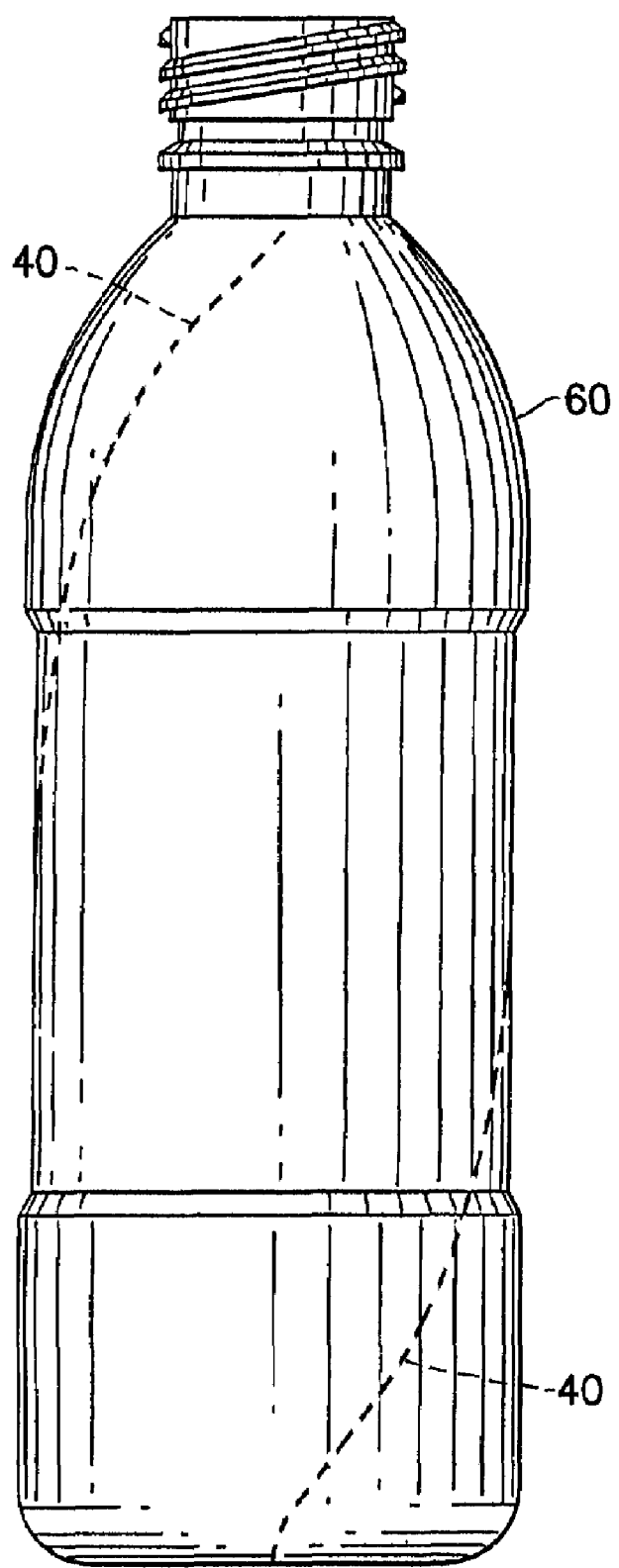
FIG. 4c is a front view of the bottle of FIGS. 4a and 4b rotated 90 degrees.

Referring to the drawings, FIGS. 1a and 1b are a side view and top view of the current state of the art preform 20, commonly used by beverage bottle manufacturers in the "injection stretch blow molding" process. Preform 20 has a top end 22, which is open and a bottom end 24, which is closed. Preform 20 is first injection molded into a similar shape and proportion as shown in FIGS. 1a and 1b from a plastic material such as polyethylene terephthalate ("PET" or "PETE"). Preform 20 is later loaded into a stretch blow molding machine where a blow molding portion 26 is heated and stretched into a blow mold and a pressurized quantity of gas is applied through top end 22 in order to expand preform 20 into the final shape of a bottle such as state of the art bottle 32 in FIG. 2a as will be describe subsequently in greater detail.

FIGS. 1c and 1d show a side view and a top view of a new preform 28, on which utility patent application Ser. No. 10/942,332 was filed on Sep. 15, 2004 and is co-pending with this patent application, both having a common inventor. New preform 28 was invented to solve the problem of how to inexpensively form a single bottle having dual separate cavities for holding contents therein such as two different beverages that may be desired by a consumer. New preform 28 has a unique flat septum 30, which is formed as an integral part of the preform during injection molding. As with state of the art preform 20, new preform 28 has a top end 22 and a blow molding portion 26 that is heated and stretched into a blow mold and a pressurized quantity of gas is applied through top end 22 in order to expand new preform 28 into the final shape of a bottle such as a new bottle 34 in FIG. 2b. Both the state of the art preform and the new preform typically employ a thread 38 on the neck 31 for attachment of a cap for closing the completed blow molded bottle after filling.

FIG. 2a is a section view of state of the art preform 20 shown superimposed with a state of the art bottle 32 that is formed from preform 20 during the stretch blow molding process known to those skilled in the art of manufacturing beverage bottles and other such containers.

FIG. 2b shows a section view of new preform 28 superimposed on a new bottle 34 that is formed from new preform 28 during the stretch blow molding process and has a unique flat septum shown in the preform state as flat septum 30 and in the final blow molded state as flat septum 30(a).

FIGS. 1a–1d, 2a and 2b demonstrate the state of the art preform and bottle without any septum or method of providing for dual beverages, as well as a recent invention by the present inventor that includes a novel feature for creating two cavities in a single part bottle formed from a preform with a flat septum.

FIG. 3a is a perspective view of the present invention. A helical preform 36 has a top end 22, which is open and a bottom end 24, which is closed and in alternative embodiments is flat, hemispherical, or other desired shape for creating the final bottle configuration. Helical preform 36 has a helical septum 40, which follows a twisted plane and in one embodiment shown in the drawings is centered inside helical preform 36 and runs from top end 22 to bottom end 24. Helical septum 40 is formed during the injection molding process as an integral part of helical preform 36 and in the embodiment shown creates two equal cavities of equal volume, each being sealably separated from the other by helical septum 40. The wall thickness of helical preform 36 including helical septum 40 may be a variety of thicknesses depending on the desired height and final wall thickness of the bottle that is formed from helical preform 36 during blow molding. Adjusting preform wall thicknesses and heating zones in order to fine tune the dimensions of the final blow molded bottle is well known to those skilled in the art of blow molding beverage bottles and other containers. Helical preform 36 may have a snap or thread feature for the purpose of engaging a cap or other bottle closing device. A thread 38 similar to the state of the art and new preforms is shown in FIG. 3a. As noted previously, helical septum 40 creates two equally proportioned cavities, a first cavity 56 and a second cavity 56(a). Helical preform 36 is formed using the injection molding process, which commonly includes a two-part mold having a "core" side and a "cavity" side. To form helical preform 36, the cavity of the mold forms all the outside shapes and dimensions including thread 38, and the core of the mold forms all the interior shapes and dimensions including helical septum 40. Those skilled in the art of manufacturing injection molds may initially view the geometry of helical septum 40 as creating an "undercut", which would render helical preform 36 unable to be ejected off of the mold core after the mold cavity has opened and the part has been formed. However, helical septum 40 is formed with a constant helical pitch (such as a screw thread on a common bolt), so that the finished helical preform 36 can simply be "unscrewed" from the mold core by an ejection device incorporated into the mold that indexes one or more lugs or notches in bottom end 24 or other areas such as indexing tab 62 on the neck of helical preform 36.

In a typical embodiment, the cavity mold is a two sided mold for easy removal from the preform. The core mold is incorporates a plug with a helical slot which is then "unscrewed" from the preform or the preform unscrewed form the core as previously described. Alternatively, an ejection sleeve is employed for removal of the preform from the core mold, allowing the preform to rotate off the core in response to pressure from the ejection sleeve. This is particularly applicable to embodiments of the preform such as that described subsequently with respect to FIG. 7.

FIG. 3b shows two stretch rods 50, each having a bottom end 52 and a top end 54. top end 54 connects to an actuation device controlled by the blow molding machine. Stretch rods are commonly used in the stretch blow molding process and are known to those skilled in the art. However, state of the art stretch blow molding requires only a single stretch rod, which is used after a state of the art preform, such as preform 20 in FIGS. 1a, 1b, and 2a has been reheated and the single stretch rod is inserted into the opening at top end 22 of preform 20 and extends downward until it contacts the inside of bottom end 24 and then continues downward and stretches the softened preform until it reaches a predetermined point at or near the bottom of the final blow mold at which time a volume of pressurized gas is applied to the interior of preform 20 to blow it into the final shape of the finished bottle such as bottle 32 in FIG. 2a. In the present invention, two stretch rods are desirable in order to evenly stretch first cavity 56 and second cavity 56(a) down into a final blow mold. It can be appreciated that a helical rotation of 180° is ideal for the purpose of creating a bottle with helical cavities such that the consumer can see both cavities from any viewing angle. However, if 180° of helical rotation (measuring from a top reference point 42 to a bottom reference point 44 were used, stretch rods 50 would contact helical septum 40 while being inserted through top end 22 and would cause damage to helical septum 40 before reaching the inside of bottom end 24 unless stretch rods 50 were complex in shape with associated rotating mechanisms for insertion and withdrawal. Accordingly, a clear path is employed in the embodiment shown in the drawings to allow the stretch rods to enter helical preform 36 through the open top end and to pass unobstructed until contacting the inside wall of the bottom end, where the stretching of helical preform 36 begins. Creating such a path for stretch rods 50 is an additional feature of the embodiment the present invention. A path for stretch rods 50 is possible by reducing the helical rotation to an amount less than 180°. A consideration of the diameter of stretch rods to be used as well as a determination of the amount of clearance necessary between stretch rods 50 and helical septum 40 will allow those skilled in the art to establish the desired angle of helical rotation of helical septum 40 between the top end and bottom end of the preform.

FIG. 3b shows a reference line 46 in a plane at the top end and a pair of reference lines 48 and 48(a) at a plane near the bottom end of the preform. A top reference point 42 associated with reference line 46 is marked on FIG. 3b as well as a bottom reference point 44 at 180° associated with reference line 48 and a bottom reference point 44(a) at 170° associated with reference line 48(a). These reference points are for explanation only and do not comprise a physical feature of the present invention. Following the path of helical septum 40 from top reference point 42 down to bottom reference point 44a, the relative rotation of the helical septum to 170° is apparent with relationship to reference lines 48 and 48(a) showing the clear area created that allows two contact points 58 for receiving bottom ends 52 of stretch rods 50 without contacting or interfering with helical septum 40. For larger contact points 58 to accommodate larger diameter stretch rods 50 or to allow more clearance between stretch rods 50 and helical septum 40 to accommodate process requirements, one practicing the invention determines an appropriate rotation for the helical septum at less than 170°.

For the embodiment shown, the preform uses an indexing feature such as tab 62 to index with the blowmolding machine so that the dual stretch rods contact the preform in the correct orientation.

FIG. 3c shows helical preform 36 with stretch rods 50 inserted through top end 22 and touching contact points 58 at bottom end 24. FIG. 3d shows helical preform 36 superimposed on a helical bottle 60, which is created following the heating of blow molding portion 26, the stretching of helical preform 36 by stretch rods 50, and the application of internal gas pressure to form helical preform 36 into a final helical bottle 60.

FIGS. 4a and 4b are a side view and top view of a helical bottle 60 formed from helical preform 36. Helical septum 40 is shown in hidden lines. First cavity 56 and second cavity 56(a) are shown in the top view.

FIG. 4c is a front view of a helical bottle 60 formed from helical preform 36. Helical septum 40 is shown in hidden lines.

Figure 5:
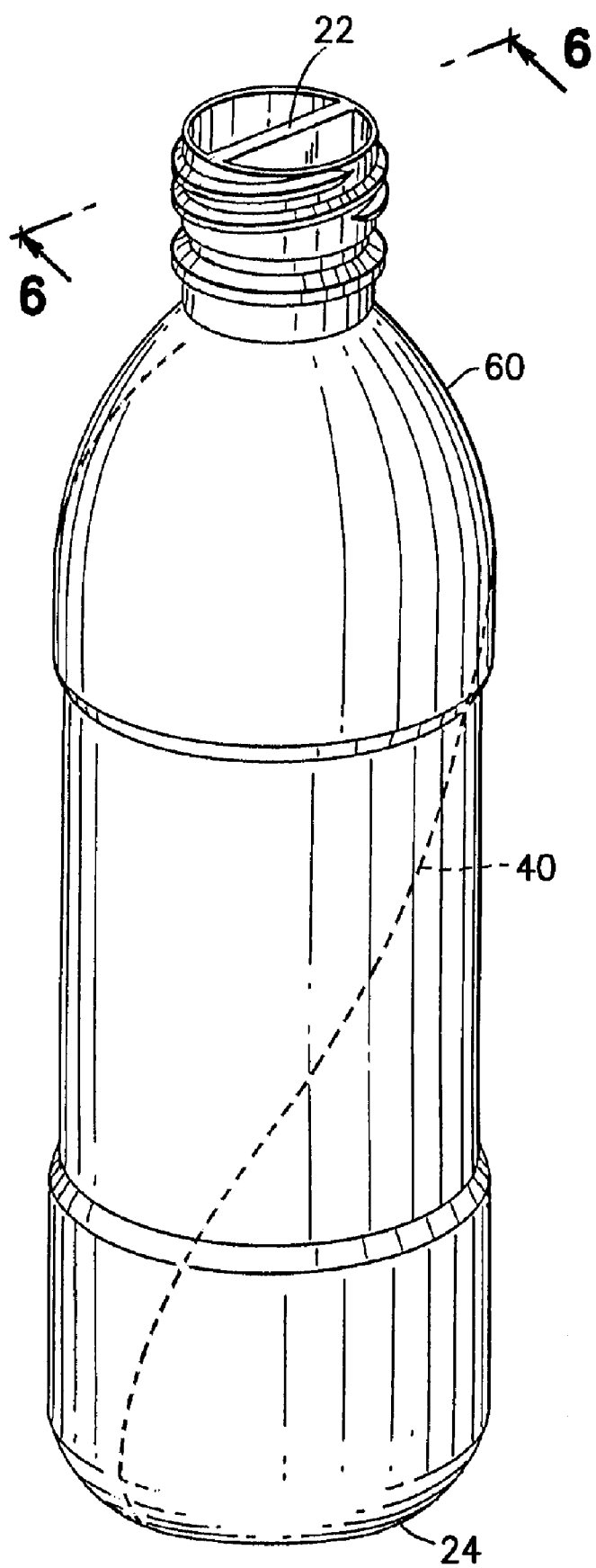
FIG. 5 is an isometric view of the bottle of FIGS. 4a–4c with a helical section 6—6 along the septum.

FIG. 5 is a perspective view of a helical bottle 60 formed from helical preform 36. Helical septum 40 is shown in hidden lines and a section view 6—6 is being taken through the center of helical septum 40 running from top end 22 to bottom end 24, the resulting section view displayed in FIG. 6.

FIG. 6 is a section view of FIG. 5, showing helical septum 40 having been sliced directly through the middle of its wall thickness in order to better show the geometry of the bottle resulting from the present invention. After taking the section view, first cavity 56 is all that remains of helical bottle 60, with second cavity 56(a) being an identical shape.

In an alternate embodiment shown in FIG. 7, helical preform 36 is designed at a longer length in order to eliminate the need for stretch rods in the blow molding process. In this longer embodiment, a helical rotation of 180° or more may be used since providing a clear path for stretch rods 50 is not necessary. Another advantage of this embodiment is that helical septum 40 is less likely to have its geometry and surface distorted by the blow molding process since it is already a length that approaches the bottom end of the final blow mold and therefore does not need to be stretched prior to the application of a pressurized quantity of gas being applied to blow helical preform 36 into a final helical bottle 60. This "pre-stretched" preform configuration is best employed with smaller and shorter bottles that feature a wide neck as opposed to longer bottles, or bottles with very small diameter neck openings. This is due to the need for a draft angle on the interior surfaces of helical preform 36, which enable it to be ejected smoothly from the injection mold core. It can be appreciated by those skilled in the art that helical preform 36 is moldable in a long, "pre-stretched" configuration if the tapering draft angle of the inner walls starts from a fairly wide neck dimension. It can further be appreciated that if a long helical preform 36 is required, but if the neck opening dimension is a small diameter, the required draft angle may cause the interior surfaces of helical preform 36 to converge at a point and dimension less than the overall length desired by the designer. Accordingly, if the designer starts with a larger diameter neck opening, the required draft angle can be accommodated to result in a helical preform 36 with the desired extended length and the required draft angle necessary for mold ejection.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for manufacturing a multiple cavity bottle comprising the steps of:
   injection molding a preform having a helical septum;
   blow molding the preform to create a bottle having a helical septum to separate the bottle into two cavities.

2. A method for manufacturing a bottle as defined in claim 1 wherein the step of injection molding further comprises the steps of:
   predetermining a contact point size based on stretch rod diameter;
   molding the helical septum with a twist from a first reference line proximate a top end of the preform to a second reference line proximate a bottom end of the preform, the sectors formed by the second reference line and a projection of the first reference line in a plane with the second reference line sufficient to accommodate the contact point size.

3. A method for manufacturing a bottle as defined in claim 2 wherein the step of blow molding comprises the steps of:
   heating the preform to a softening temperature;
   inserting a stretch rod from the top end of the preform to a contact point in the sectors;
   extending the stretch rod to stretch the preform; and
   introducing gas pressure into the preform to stretch a blow molding portion into a final bottle shape within a mold.

4. A method for manufacturing a bottle as defined in claim 1 wherein the step of injection molding further comprises the steps of:

providing a mold assembly incorporating a helical core mold received within a two sided cavity mold;
injecting plastic into the mold assembly;
allowing partial cooling of the molded plastic; and
removing the helical core mold by unscrewing it from the molded preform.

5. A method for manufacturing a bottle as defined in claim 1 wherein the step of injection molding further comprises the steps of:
providing a mold assembly incorporating a helical core mold received within a two sided cavity mold;
injecting plastic into the mold assembly;
allowing partial cooling of the molded plastic; and
unscrewing the preform from the core mold.

6. A method for manufacturing a bottle as defined in claim 4 further including the step of:
providing an indexing feature in the cavity mold to create a mating indexing feature in the preform.

7. A method for manufacturing a bottle as defined in claim 1 wherein the step of injection molding comprises:
injection molding a preform with a helical septum and having a length substantially equal to the final bottle dimension.

8. A method for manufacturing a bottle as defined in claim 7 further comprising the steps of:
providing a mold assembly comprised of a helical core mold received within a two sided cavity mold;
injecting plastic into the mold assembly;
allowing partial cooling of the molded plastic; and
removing the helical core mold by unscrewing it from the molded preform.

9. A method for manufacturing a bottle as defined in claim 7 further comprising the steps of:
providing a mold assembly comprised of a helical core mold received within a two sided cavity mold;
injecting plastic into the mold assembly;
allowing partial cooling of the molded plastic; and
unscrewing the preform from the core mold.

10. A method for manufacturing a bottle as defined in claim 9 further including the step of:
providing an indexing feature in the cavity mold to create a mating indexing feature in the preform.

11. A method for manufacturing a bottle as defined in claim 7 further comprising the steps of:
providing a mold assembly comprised of a helical core mold with an ejector sleeve, the core mold received within a two sided cavity mold;
injecting plastic into the mold assembly;
allowing partial cooling of the molded plastic removing the two sided cavity mold; and
ejecting the preform with the ejector sleeve, the preform rotating from the core mold.

12. A method for manufacturing a bottle as defined in claim 1 further comprising the steps of:
providing a mold assembly comprised of a helical core mold with an ejector sleeve, the core mold received within a two sided cavity mold;
injecting plastic into the mold assembly;
allowing partial cooling of the molded plastic removing the two sided cavity mold; and
ejecting the preform with the ejector sleeve, the preform rotating from the core mold.

13. A method for manufacturing a bottle as defined in claim 2 wherein the step of blow molding comprises the steps of:
heating the preform to a softening temperature;
inserting at least two stretch rods from the top end of the preform to the contact points in the sectors;
extending the stretch rods to stretch the preform; and
introducing gas pressure into the preform to stretch a blow molding portion into a final bottle shape within a mold.

* * * * *